United States Patent
McAfee

(10) Patent No.: US 10,025,761 B2
(45) Date of Patent: *Jul. 17, 2018

(54) VIRTUAL EMBEDDING OF FILES IN DOCUMENTS

(71) Applicant: ADOBE SYSTEMS INCORPORATED, San Jose, CA (US)

(72) Inventor: Robert K. McAfee, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 792 days.

This patent is subject to a terminal disclaimer.

(21) Appl. No.: 14/468,233

(22) Filed: Aug. 25, 2014

(65) Prior Publication Data

US 2014/0365857 A1    Dec. 11, 2014

Related U.S. Application Data

(63) Continuation of application No. 12/326,691, filed on Dec. 2, 2008, now Pat. No. 8,818,959.

(51) Int. Cl.
  *G06F 17/30* (2006.01)
  *G06F 17/22* (2006.01)
  *H04L 29/08* (2006.01)

(52) U.S. Cl.
  CPC ...... *G06F 17/2247* (2013.01); *G06F 17/3007* (2013.01); *G06F 17/30896* (2013.01); *H04L 67/1097* (2013.01)

(58) Field of Classification Search
  CPC .................................................. G06F 17/2247
  See application file for complete search history.

(56) References Cited

U.S. PATENT DOCUMENTS

| 5,706,457 | A  | 1/1998 | Dwyer et al. |
| 6,237,011 | B1 | 5/2001 | Ferguson et al. |
| 6,278,455 | B1 | 8/2001 | Baker |
| 6,292,186 | B1 | 9/2001 | Lehman et al. |

(Continued)

FOREIGN PATENT DOCUMENTS

| EP | 1383265 A1 | 1/2004 |
| GB | 2364408 A  | 1/2002 |

(Continued)

OTHER PUBLICATIONS

Final Office Action dated Apr. 22, 2016 in U.S. Appl. No. 12/123,624, 30 pages.

(Continued)

*Primary Examiner* — Mahesh H Dwivedi
(74) *Attorney, Agent, or Firm* — Shook, Hardy & Bacon, L.L.P.

(57) ABSTRACT

Various embodiments herein include one or more of systems, methods, software, and data structures that provide for virtual packaging, or embedding, of electronic files in other files. For example, rather than packaging an electronic file directly in a document file, metadata may be added to the document file including a Universal resource Identifier (URI), such as a Universal Resource Locator (URL), referencing a location where the electronic file may be downloaded from. Other embodiments are described and illustrated herein for creating, viewing, storing, and transmitting such document files with virtually packaged electronic files.

20 Claims, 8 Drawing Sheets

(56) References Cited

U.S. PATENT DOCUMENTS

| | | | |
|---|---|---|---|
| 6,304,897 B1 | 10/2001 | Venkatraman et al. | |
| 6,463,533 B1 | 10/2002 | Calamera et al. | |
| 6,636,246 B1 | 10/2003 | Gallo et al. | |
| 7,013,435 B2 | 3/2006 | Gallo et al. | |
| 7,031,968 B2 | 4/2006 | Kremer et al. | |
| 7,035,880 B1* | 4/2006 | Crescenti | G06F 11/1464 |
| 7,076,728 B2 | 7/2006 | Davis et al. | |
| 7,089,248 B1 | 8/2006 | King et al. | |
| 7,139,977 B1 | 11/2006 | Russell | |
| 7,412,650 B2 | 8/2008 | Gallo | |
| 7,506,359 B1 | 3/2009 | Ling | |
| 7,526,726 B1* | 4/2009 | Skwarecki | G11B 27/034 |
| | | | 715/730 |
| 7,603,615 B2 | 10/2009 | Lee et al. | |
| 7,634,775 B2 | 12/2009 | McLuckie et al. | |
| 7,823,064 B1 | 10/2010 | Levy | |
| 7,913,053 B1* | 3/2011 | Newland | G06Q 10/107 |
| | | | 173/165 |
| 8,479,087 B2 | 7/2013 | Swineford et al. | |
| 8,566,711 B1* | 10/2013 | Srivastava | G06F 17/212 |
| | | | 715/243 |
| 8,578,261 B1 | 11/2013 | Gupta et al. | |
| 8,677,229 B2 | 3/2014 | McAfee et al. | |
| 2001/0039540 A1 | 11/2001 | Hofmann et al. | |
| 2002/0059337 A1 | 5/2002 | Takaoka et al. | |
| 2002/0073058 A1 | 6/2002 | Kremer et al. | |
| 2002/0147735 A1 | 10/2002 | Nir | |
| 2003/0033296 A1 | 2/2003 | Rothmuller et al. | |
| 2003/0066027 A1 | 4/2003 | Nakagiri | |
| 2003/0115171 A1* | 6/2003 | Mangalvedhekar | G06F 17/30067 |
| 2003/0196120 A1 | 10/2003 | Raley et al. | |
| 2004/0004636 A1 | 1/2004 | van Driel | |
| 2004/0049513 A1* | 3/2004 | Yakir | G06F 17/30153 |
| 2004/0201668 A1 | 10/2004 | Matsubara et al. | |
| 2004/0205633 A1 | 10/2004 | Martinez | |
| 2004/0210535 A1 | 10/2004 | Erickson | |
| 2004/0215657 A1 | 10/2004 | Drucker et al. | |
| 2005/0149549 A1 | 7/2005 | Jaspers et al. | |
| 2005/0151756 A1 | 7/2005 | Miyamoto et al. | |
| 2005/0165726 A1 | 7/2005 | Kawell et al. | |
| 2005/0177389 A1 | 8/2005 | Rakowicz et al. | |
| 2005/0193330 A1 | 9/2005 | Peters | |
| 2005/0209955 A1 | 9/2005 | Underwood et al. | |
| 2005/0210416 A1 | 9/2005 | MacLaurin et al. | |
| 2005/0216532 A1* | 9/2005 | Lallier | G06F 3/0605 |
| 2005/0240618 A1 | 10/2005 | Nickerson et al. | |
| 2005/0251748 A1 | 11/2005 | Gusmorino et al. | |
| 2005/0268217 A1 | 12/2005 | Garrison | |
| 2006/0074869 A1 | 4/2006 | Rosenberg et al. | |
| 2006/0080269 A1 | 4/2006 | MacLaurin | |
| 2006/0156228 A1 | 7/2006 | Gallo et al. | |
| 2006/0161863 A1 | 7/2006 | Gallo | |
| 2006/0178215 A1 | 8/2006 | Lehikoinen et al. | |
| 2006/0184540 A1 | 8/2006 | Kung et al. | |
| 2006/0206807 A1 | 9/2006 | Rosner et al. | |
| 2006/0291504 A1 | 12/2006 | Cohn | |
| 2007/0016546 A1 | 1/2007 | De Vorchik et al. | |
| 2007/0033237 A1 | 2/2007 | Prahlad et al. | |
| 2007/0050412 A1 | 3/2007 | Robertson et al. | |
| 2007/0067362 A1* | 3/2007 | McArdle | G06F 17/30073 |
| 2007/0101008 A1 | 5/2007 | Gomez | |
| 2007/0156586 A1 | 7/2007 | Kerschbaum | |
| 2007/0162953 A1 | 7/2007 | Bolliger et al. | |
| 2007/0168374 A1 | 7/2007 | Bourne et al. | |
| 2007/0192739 A1 | 8/2007 | Hunleth et al. | |
| 2007/0204211 A1 | 8/2007 | Paxson | |
| 2007/0220094 A1 | 9/2007 | Kerschbaum et al. | |
| 2007/0226204 A1 | 9/2007 | Feldman | |
| 2007/0240079 A1 | 10/2007 | Flynt et al. | |
| 2008/0001946 A1 | 1/2008 | Ishikawa | |
| 2008/0028333 A1* | 1/2008 | Perelman | G06F 17/243 |
| | | | 715/780 |
| 2008/0034381 A1 | 2/2008 | Jalon et al. | |
| 2008/0082575 A1 | 4/2008 | Peter et al. | |
| 2008/0097879 A1 | 4/2008 | Sadowski et al. | |
| 2008/0130966 A1 | 6/2008 | Crucs | |
| 2008/0163122 A1 | 7/2008 | Wolf | |
| 2009/0089656 A1* | 4/2009 | McAfee | G06F 17/2205 |
| | | | 715/234 |
| 2009/0217173 A1 | 8/2009 | Manheimer | |
| 2009/0292980 A1* | 11/2009 | Swineford | G06F 17/21 |
| | | | 715/202 |
| 2010/0057765 A1* | 3/2010 | Dispensa | H04L 51/00 |
| | | | 707/E17.01 |
| 2010/0057884 A1 | 3/2010 | Brownell et al. | |
| 2010/0179943 A1 | 7/2010 | Anand et al. | |
| 2010/0306283 A1 | 12/2010 | Johnson et al. | |
| 2014/0032478 A1 | 1/2014 | McAfee | |
| 2014/0032482 A1* | 1/2014 | Dulaney | G06F 17/30056 |
| | | | 707/607 |
| 2014/0033017 A1* | 1/2014 | McAfee | G06F 3/14 |
| | | | 715/234 |
| 2014/0033046 A1 | 1/2014 | Walsh et al. | |
| 2014/0033047 A1 | 1/2014 | Poling et al. | |

FOREIGN PATENT DOCUMENTS

| | | | |
|---|---|---|---|
| WO | 0157615 A2 | 8/2001 | |
| WO | 2005034423 A2 | 4/2005 | |
| WO | 2009045679 A1 | 4/2009 | |
| WO | 09143139 A2 | 11/2009 | |

OTHER PUBLICATIONS

Notice of Allowance dated May 20, 2016 in U.S. Appl. No. 12/123,640, 9 pages.

CreativSpace image search—finally a cool image search, [Online] Retrieved from the Internet: May 15, 2008 <URL:http://creativspace.aU>, 1 page.

Dynamic PageFlip 3.4, [Online] Retrieved from the Internet: Apr. 15, 2008 <URL:http://www.pageflip.hu/>, 2 pages.

Great cover version, Apple-iTunes-iTunes Jukebox—Cover Flow, [Online] Retrieved from Internet: May 19, 2008 <URL:http://www.apple.com/itunes/jukebox/coverflow.html>, 1 page.

Open Packaging Format (OPDF) 2.0 v0.984, [Online]. Retrieved from the Internet: <URL:htto://www.idpf.org/2007/opf/OPF_2.0_0.0984_draft.html>, (Apr. 16, 2007), 35 pgs.

POD Tech Combine PDF's, Adobe Acrobat 8 Packages: Combine PDFs 1 PodTech.net,[Online] Retrieved from the Internet: Apr. 15, 2008 < URL: http://www. podtech.net/home/1761/adobe-acrobat-8-packages-combine-pdfs>,(Dec. 29, 2006), 2 pages.

Specifications for the Digital Talking Book, http://www.niso.org/workrooms/daisy/Z39-86-2005.pdf, Navigation Control File (NCX), (Apr. 21, 2005), 43-56.

37 Signals, "Signal vs. Noise", Cover Flow and the scrolling horizontal subnav at the new Apple.com, [Online]. Retrieved from the internet<URL:http://www.37signals.com/svn/posts/464-cover-flow-and-the-scrolling-%20horizontal-subnav-at-the-new-applecom#extended>, (May 15, 2008), 18 pages.

Strother, Jonathan, et al., "Cover Flow", From Wikipedia, the free encyclopedia (Redirected from Cover flow), [Online] Retrieved from the internet: May 15, 2008 <URL:http://en.wikipedia.org/wiki/Cover flow>, (Sep. 11, 2006), 2 page.

Graham, Jamey, et al., "iCandy: a Tangible User Interface for iTunes", Copyright is held by the author/owner(s). CHI 2008, Apr. 5, 2008, Florence, Italy.ACM 978-1-60558-012-8/08/04., (Apr. 5, 2008), 6 pages.

Toub S. View Data Your Way With Our Managed Preview Handler Framework. MSDN [serial online]. Jan. 2007; vol. 22Issue 1, pp. 52-67. Available from: Computers & Applied Sciences Complete, Ipswich, MA. Accessed Feb. 11, 2011.

E. D.Zwicky, Further torture: more testing of backup and archive programs, in: Proceedings of The 17th Annual Large Installation Systems Administration Conference, LISA 2003, Oct. 2003, San Diego, CA, USA.

The Microsoft Office Open XML Formats, Preview for Developers, Microsoft, (Jun. 2005(, 1-21.

(56) References Cited

OTHER PUBLICATIONS

Bott, et al., "Special Edition Using Microsoft Office 2007", Que Publishing, (Dec. 22, 2006), 62.
Rice, Frank, "How To: Manipulate Office Open XML Formats Documents", Microsoft, (Dec. 2006), 1-19.
HyperCard: Installation and New Features, Apple computers (1998), 1-149.
Acrobat Multimedia JavaScript Reference, Version: Acrobat 6.0, Adobe Systems Incorporated, (Apr. 2004), pp. 1-125.
Adobe Presenter 6 User Guide, copyright 2006 Adobe, pp. 1-79.
International Application Serial No. PCT/US2008/075388, Written Opinion dated Jan. 13, 2009, 7 pgs.
International Application Serial No. PCT/US2009/044496, Search Report and Written Opinion mailed Jun. 3, 2010, 10 pgs.
Non-Final Office Action dated Nov. 15, 2011 in U.S. Appl. No. 12/326,691, 37 pages.
Final Office Action dated Apr. 8, 2012 in U.S. Appl. No. 12/326,691, 42 pages.
Non-Final Office Action dated Oct. 21, 2013 in U.S. Appl. No. 12/326,691, 23 pages.
Notice of Allowance dated Apr. 16, 2014 in U.S. Appl. No. 12/326,691, 8 pages.
Non-Final Office Action dated Feb. 17, 2011 in U.S. Appl. No. 11/864,694, 21 pages.
Final Office Action dated Aug. 31, 2011 in U.S. Appl. No. 11/864,694, 18 pages.
Non-Final Office Action dated May 23, 2014 in U.S. Appl. No. 11/864,694, 16 pages.
Final Office Action dated Dec. 12, 2014 in U.S. Appl. No. 11/864,694, 23 pages.
Notice of Allowance dated Jun. 4, 2015 in U.S. Appl. No. 11/864,694, 7 pages.
Non-Final Office Action dated Jun. 9, 2011 in U.S. Appl. No. 12/123,640, 28 pages.
Final Office Action dated Dec. 2, 2011 in U.S. Appl. No. 12/123,640, 32 pages.
Non-Final Office Action dated Jan. 31, 2014 in U.S. Appl. No. 12/123,640, 25 pages.
Final Office Action dated Oct. 22, 2014 in U.S. Appl. No. 12/123,640, 26 pages.
Non-Final Office Action dated Jul. 1, 2015 in U.S. Appl. No. 12/123,624, 20 pages.
Non-Final Office Action dated Dec. 7, 2010 in U.S. Appl. No. 12/123,624, 17 pages.
Final Office Action dated May 27, 2011 in U.S. Appl. No. 12/123,624, 19 pages.
Non-Final Office Action dated Dec. 18, 2013 in U.S. Appl. No. 12/123,624, 27 pages.
Final Office Action dated Jul. 2, 2014 in U.S. Appl. No. 12/123,624, 34 pages.
Non-Final Office Action dated Jul. 2, 2015 in U.S. Appl. No. 12/123,624, 28 pages.
Non-Final Office Action dated Sep. 11, 2012 in U.S. Appl. No. 13/052,829, 18 pages.
Final Office Action dated Feb. 12, 2013 in U.S. Appl. No. 13/052,829, 20 pages.
Non-Final Office Action dated Nov. 14, 2013 in U.S. Appl. No. 13/052,829, 19 pages.
Final Office Action dated Jul. 8, 2014 in U.S. Appl. No. 13/052,829, 23 pages.
Notice of Allowance dated Apr. 24, 2015 in U.S. Appl. No. 13/052,829, 20 pages.
Non-Final Office Action dated Feb. 16, 2011 in U.S. Appl. No. 11/864,714, 20 pages.
Final Office Action dated Aug. 5, 2011 in U.S. Appl. No. 11/864,714, 17 pages.
Non-Final Office Action dated Sep. 20, 2012 in U.S. Appl. No. 11/864,714, 14 pages.
Final Office Action dated Apr. 17, 2013 in U.S. Appl. No. 11/864,714, 17 pages.
Notice of Allowance dated Oct. 24, 2013 in U.S. Appl. No. 11/864,714, 11 pages.
Non-Final Office Action dated May 27, 2011 in U.S. Appl. No. 12/123,624, 19 pages.
Final Office Action dated Sep. 28, 2011 in U.S. Appl. No. 12/123,624, 2 pages.
Non-Final Office Action dated Oct. 5, 2012 in U.S. Appl. No. 12/123,615, 29 pages.
Notice of Allowance dated Mar. 1, 2013 in U.S. Appl. No. 12/123,615, 17 pages.
Non-Final Office Action dated May 27, 2011 in U.S. Appl. No. 12/123,635, 19 pages.
Final Office Action dated Nov. 22, 2011 in U.S. Appl. No. 12/123,635, 24 pages.
Non-Final Office Action dated Jun. 7, 2012 in U.S. Appl. No. 12/123,635, 24 pages.
Final Office Action dated Dec. 6, 2012 in U.S. Appl. No. 12/123,635, 27 pages.
Notice of Allowance dated Feb. 3, 2014 in U.S. Appl. No. 12/123,635, 9 pages.
Notice of Allowance dated Apr. 7, 2017 in U.S. Appl. No. 12/123,624, 9 pages.
Notice of Allowance dated Dec. 15, 2017 in U.S. Appl. No. 12/123,624, 9 pages.

* cited by examiner

```
400
%PDF-1.X
    1 0 OBJ
        % CALL TO NAVIGATOR/PACKAGED FILE PRESENTATION
        % SHELL FILE
    ENDOBJ 2 0 OBJ
        % PACKAGED SWF FILE WITH NODE META DATA
        % DESCRIBING AND REFERENCING PACKAGED FILES
        % 1, 2, AND 3
    ENDOBJ 3 0 OBJ
        % URI OF PACKAGED FILE 1
    ENDOBJ 4 0 OBJ
        % URI OF PACKAGED FILE 2
    END OBJ 5 0 OBJ
        % PACKAGED FILE 3
    ENDOBJ 6 0 OBJ
        % IMAGE FILE REFERENCED BY THE PACKAGED FILE
        % PRESENTATION SHELL FILE
    ENDOBJ

TRAILER
        % INDEX TO OBJECTS
    END TRAILER

%%EOF
```

FIG. 4

VIRTUAL EMBEDDING OF FILES IN DOCUMENTS

CROSS-REFERENCE TO RELATED APPLICATIONS

This application is a continuation of and claims priority from U.S. application Ser. No. 12/326,691, filed Dec. 2, 2008, entitled "Virtual Embedding Of Files In Documents," which is assigned or under obligation of assignment to the same entity as this application, the entire contents of each application being herein incorporated by reference.

BACKGROUND INFORMATION

Page description language documents, such as Portable Document Format documents, are heavily used for many purposes. The number of purposes continues to grow as page description language specifications are expanded to provide more and more options for document creation and presentation. One of these options is the ability to package, or embed, files within a page description language document (hereafter PDLD). As files are packaged within a page description language document, the file size of the PDLD grows. As the file size grows, the ability to distribute the PDLD may be diminished.

BRIEF DESCRIPTION OF THE DRAWINGS

FIG. 4 is a pseudo code listing of a page description language document according to an example embodiment.

DETAILED DESCRIPTION

Figure 1:
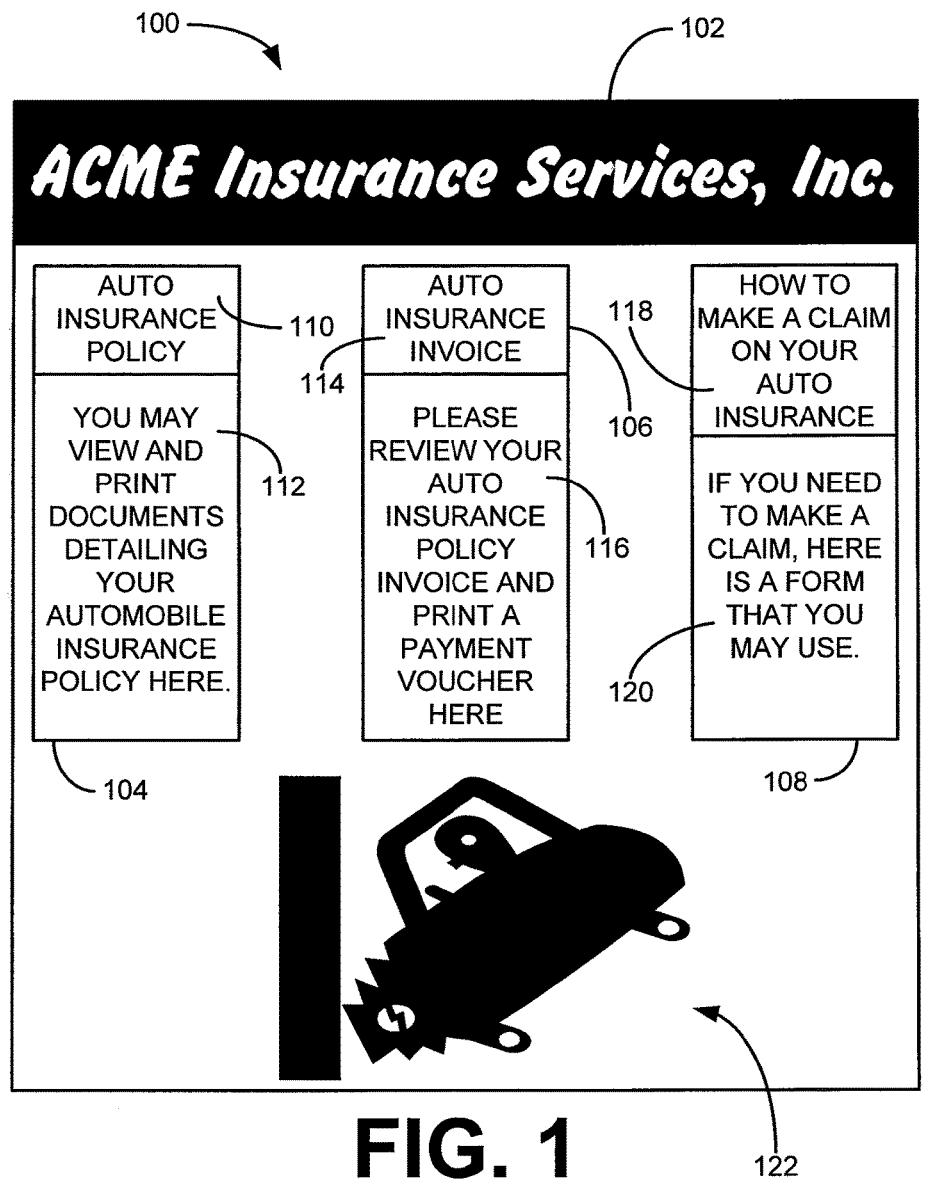
FIG. 1 is a user interface illustration according to an example embodiment.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application specific integrated circuit. Thus, the exemplary process flow is applicable to software, firmware, and hardware implementations.

It has become increasingly common to create, transmit, and display documents in electronic format. Electronic documents have a number of advantages over paper documents including their ease of transmission, their compact storage, and their ability to be edited and/or electronically manipulated. A page in an electronic document can include various types of graphical elements, including text, line art, and images. Electronic documents are generally created by computer programs (also called application programs or simply applications) that can be executed by a user on a computer to create and edit electronic documents and to produce (directly or indirectly) printed output defined by the documents. Such programs include the ADOBE ILLUSTRATOR® and PHOTOSHOP® products, both available from ADOBE SYSTEMS INCORPORATED of San Jose, Calif. Computer programs typically maintain electronic documents as document files that can be saved on a computer hard drive or a portable medium such as a USB drive or floppy diskette. An electronic document does not necessarily correspond to a document file. An electronic document can be stored in a portion of a document file that holds other documents, in a single document file dedicated to the electronic document in question, or in multiple coordinated document files. Graphical elements in electronic documents can be represented in vector form, raster form, or in hybrid forms.

An electronic document is provided by an author, distributor, or publisher who often desires that the document be viewed with a particular appearance, such as the appearance with which it was created. A portable electronic document can be viewed and manipulated on a variety of different platforms and can be presented in a predetermined format where the appearance of the document as viewed by a reader is as it was intended by the publisher. One such predetermined format is the Portable Document Format ("PDF") developed by ADOBE SYSTEMS INCORPORATED. The class of such predetermined formats is often referred to as a page description language. An example of page-based software for creating, reading, and displaying PDF documents is the ADOBE ACROBAT® program, also of ADOBE SYSTEMS INCORPORATED. The ADOBE ACROBAT® program is based on ADOBE SYSTEMS INCORPORATED'S POSTSCRIPT® technology, which describes formatted pages of a document in a device-independent fashion. An ADOBE ACROBAT® program on one platform can create, display, edit, print, annotate, etc. a PDF document produced by another ADOBE ACROBAT® program running on a different platform, regardless of the type of computer platform used. A document in a certain format or language, such as a word processing document, can be translated into a PDF document using the ADOBE ACROBAT® program. A PDF document can be quickly displayed on any computer platform having the appearance intended by the publisher, allowing the publisher to control the final appearance of the document.

PDLD files may also include one or more files packaged, or embedded therein. For example, a PDLD file may also include another page description language document, spreadsheet document, video file, or other electronic file type. As files are packaged within a page description language document, the file size of the PDLD grows. As the file size grows, some advantages provided by the PDLD file type may be diminished by the increased file size. Such packaged files may not be as easy to transmit, such as via email when a recipient's email server does not allow reception of emails over a certain file size.

Various embodiments described herein provide mechanisms that provide for virtual packaging, or embedding, of electronic files in document files. For example, rather than packaging an electronic file directly in a document file, metadata may be added to the document file including a Universal Resource Identifier (URI), such as a Universal Resource Locator (URL), referencing a location from which the electronic file may be downloaded. Other embodiments are described and illustrated herein for creating, viewing, storing, and transmitting such document files with virtually packaged electronic files.

FIG. 1 is a user interface 100 illustration according to an example embodiment. The user interface 100 illustrates a PDLD including three packaged files created for a recipient presented using a packaged file presentation shell (PFPS). The PFPS, when instantiated in the user interface 100 includes a header 102, a body including three columns 104, 106, 108, and a footer including an image 122. The page description language document, in some embodiments, is a Portable Document Format ("PDF") document.

The header 102, in this embodiment, includes a graphic of a company of origin of the page description language document. The graphic is instantiated from an image file that may also be packaged within the page description language document. However, in some embodiments, the image file may be virtually packaged in the PDLD by including an Internet address in metadata of the PFPS or elsewhere in the POLO. Thus, in the event the company of origin modifies its image file, an updated image file may be stored to the Internet address and subsequent views of the POLO using the PFPS will display the modified image file. Further, a file size of the PDLD may be reduced by removing the image file from the page description language document. In some embodiments, the package file presentation shell may also be virtually packaged.

The columns 104, 106, 108 of the body portion of the user interface 100 include a column for each of three documents. The columns may each include a title 110, 114, 118 and a description 112, 116, 120. The titles and descriptions provide information to a viewer about a packaged file that may be viewed by selecting a respective column 104, 106, 108. For example, a user may desire to view information regarding the user's auto insurance policy. The user in such an example would select the left most column 104, such as by clicking a mouse on the column. Such a selection, in some embodiments, may cause the underlying file to be displayed, such as in the user interface 200 of FIG. 2 described below.

One or more of the three documents represented by respective columns 104, 106, 108 may be virtually packaged within the PDLD presented in the user interface 100. When such a document is virtually packaged in the page description language document, the POLO includes a URI in metadata referencing a location from which the document may be retrieved. The title and description of that document may also be included in the metadata. However, in other embodiments, the title and description may be obtained from the document upon retrieval.

Figure 2:
FIG. 2 is a user interface illustration according to an example embodiment.

FIG. 2 is a user interface 200 illustration according to an example embodiment. The user interface 200 presents the auto insurance policy information file that is referenced by metadata underlying the left most column 104 of the user interface 100 in FIG. 1. In this embodiment, the auto insurance policy information file is virtually packaged in the PDLD illustrated in FIG. 1. Upon receipt of a selection of the left most column 104 in FIG. 1, a computer application presenting the user interfaces 100 and 200 will retrieve the auto insurance policy information file from a network location identified by a URI in the PDLD metadata. The auto insurance policy information file may then be displayed in the user interface 200.

The user interface 200 includes a header 202 and a body 204. The header 202 includes the same image file of the header 102 in the user interface 100 of FIG. 1. However, this image file need not be the same. This user interface 200 may be defined in a manner completely independent of other user interfaces. However, each of the files underlying the columns 104, 106, 108 of the user interface 100 of FIG. 1 may be displayed in the user interface 200. The body 204 is an area within which a selected document, or other electronic file type depending on the embodiment, may be displayed. The pane in various embodiments may be utilized to present documents, video, images, text, and other file and media types.

The user interfaces 100 and 200 of FIG. 1 and FIG. 2 are merely examples of PFPSs that may be created by developers and users. Packaged files including virtually packaged electronic files can be presented without using a PFPS. However, when presenting packaged files, virtually packaged or otherwise, the only real limits on what such user interfaces may look like and how they may behave are relative to the scope of the PFPS developer's imagination.

Figure 3:
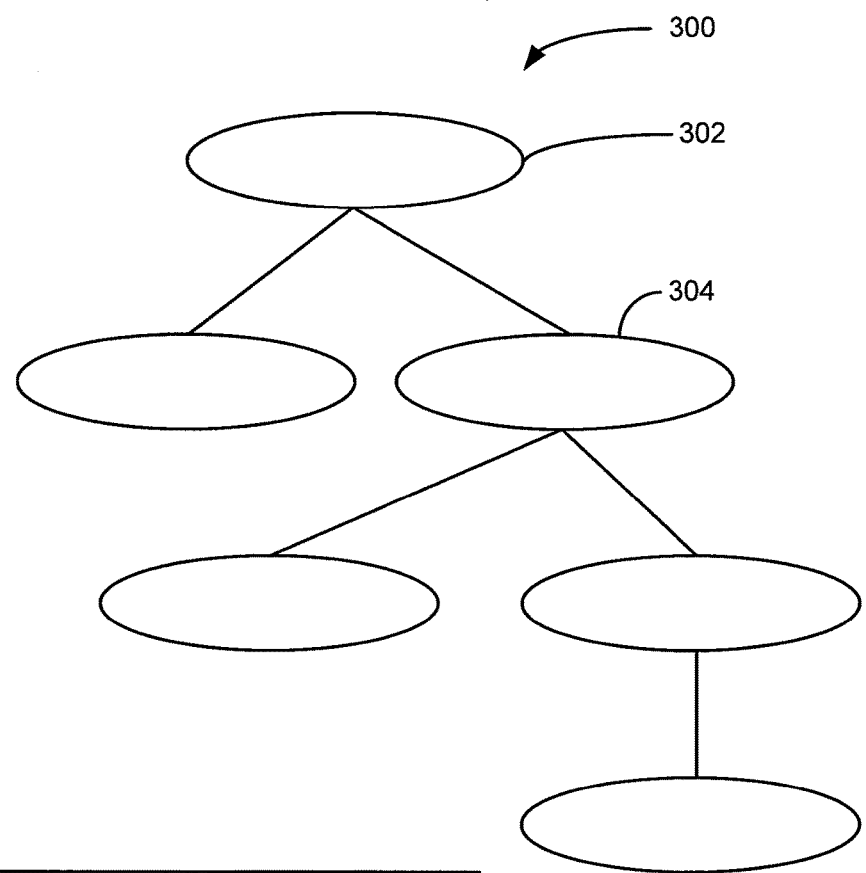
FIG. 3 is an illustration of a hierarchical node packaged file presentation shell according to an example embodiment.

For example, FIG. 3 is an illustration of a hierarchical node PFPS 300 according to an example embodiment. Such a hierarchical node PFPS 300 may include multiple nodes which may be expanded and contracted by a viewer within in a hierarchical fashion when instantiated within a page description language reader application. Such a hierarchical node PFPS 300 is therefore viewer interactive.

The example hierarchical node PFPS 300 includes a top-level node 302 and multiple lower level nodes 304. In some embodiments, although the nodes may be at different levels in the hierarchy, each node may include identical data elements. For example, the data elements of each node, as in the illustrated data structure 306, may include:

a node name;
a reference to a parent node;
a reference to a package file that may include a reference to a packaged file present in the document file or a URI of a network location from which the packaged file may be retrieved;
referenced package file properties, such as file name, size, type, a created date, and a modified date;

one or more icons or other images that may be used to represent the reference packaged file within the PFPS when instantiated;

a description of the referenced packaged file; and a location within the PFPS to display the reference packaged file.

In other embodiments, there may be fewer or greater numbers of data elements and the data elements may be different depending on what is specified by a PFPS developer. Some or all of these data elements may be displayed within a respective node, a column, a PFPS hot spot such as a link, or other location specified within a PFPS.

FIG. 4 is a pseudo code listing 400 of a document file according to an example embodiment. The document file, in this embodiment, includes five packaged files. The five packaged files include a PFPS in document object 2.0 OBJ, packaged files 1, 2, and 3 in document objects 3.0, 4.0, and 5.0 OBJs, and an image file in document object 6.0 OBJ that is referenced in the PFPS. The pseudo code listing 400 includes a call to a PFPS. In some embodiments, when a document includes a PFPS, the PFPS is instantiated upon opening the document file. The 2.0 OBJ that includes the PFPS may include a URI of a network location from which the PFPS may be downloaded rather than holding the actual content of the PFPS.

A data structure of a PFPS included as a packaged file may include metadata associating each of one or more packaged files within a document file to a presentation node of the PFPS. A presentation node may or may not be a hierarchical presentation node. The data structure of the PFPS may further include data defining a packaged file presentation header to be presented with a packaged file when selected within a document reader application for display, such as is illustrated in FIG. 2. In some embodiments, the PFPS also includes instructions executable within an environment of the document reader application to cause the PFPS to be instantiated and displayed within a graphical user interface of the document reader application. In some embodiments, the instructions may also be executable to modify an appearance of the displayed PFPS in response to one or more events, such as a user clicking a mouse on a node.

The other packaged files represented in the pseudo code listing 400 are provided in the 3.0, 4.0, and 5.0 OBJs. The metadata of the 3.0 and 4.0 OBJs each include a URI of a location from which the respective file may be downloaded. The 5.0 OBJ includes the data of the packaged file 3. This illustrates an embodiment where less than all of the packaged files are physically included within the document file.

In some embodiments, the document file of the pseudo code listing 400 is an example of a document file that may be distributed by an author. The document may be distributed in any number of ways including email, disk, posting to a network location such as a shared drive or web site, peer-to-peer file sharing, or other distribution means. When the document file is opened and a virtually packaged file is retrieved from a location identified by a URI, the document file may be modified to include the content of the retrieved file. As a result, later access to the retrieved file will not require another retrieval of the packaged file as it is now present within the document file. However, the URI may remain in the document as a location to which to post updates to the retrieved document.

Figure 5:
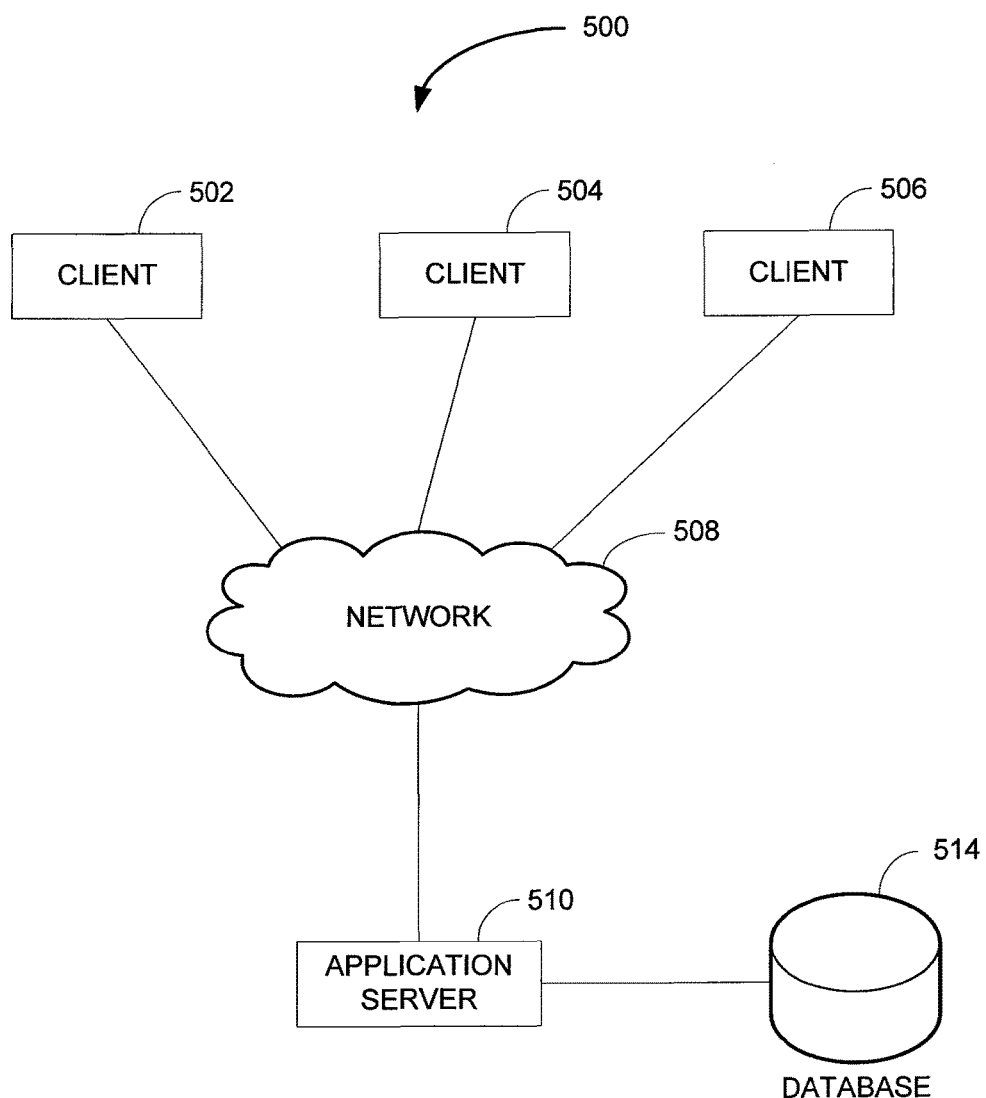
FIG. 5 is a logical block diagram of a networked computing environment according to an example embodiment.

FIG. 5 is a logical block diagram of a networked computing environment 500 according to an example embodiment. The networked computing environment 500 is a computing environment within which various embodiments may operate. The networked computing environment 500 includes client computing devices 502, 504 and 506 that communicate with one another and one or more servers, such as an application server 510 over a network 508. The network 508 may be of one or more network types, such as the Internet, a local area network, a wide area network, a virtual private network, and other network types. The client computing devices 502, 504 and 506 may be of various types of computing devices, such as personal computers, laptop computers, handheld computing devices, smart phones, set-top boxes, and other computing device types. Although the networked computing environment 500 is illustrated as including the single application server 510, the network computing environment 500 may include other server types and more than one server. When there are multiple servers, the networked computing environment 500 may include servers of various types, such as file servers, web servers, application servers, database servers, and other server types. In some embodiments, the application server 510 may provide indirect access to a database 514 that stores virtual packaged files referenced within document files and other data associated therewith. The associated data may include data representative of updates to packaged files stored in the database 514, descriptive metadata of the stored virtual packaged files, security data identifying users allowed to access data stored in the database 514, and other data depending on the particular embodiment.

In some embodiments, the database 514 stores document files with packaged files. An application executing on a client computing device 502 may request one of the stored document files from the application server 510. The application server will retrieve the requested file and provide it to the requesting client computing device 502 application.

However, in another embodiment, the application executing on a client computing device 504 may already possess a document file with one or more virtually packaged files. The application executing on the client computing device 504, upon receipt of a request to display a virtually packaged file will obtain the URI of the file and communicate a request over the network 508 for the virtually packaged file to the application server 510 based on the URI. The application server 510 may then retrieve only the requested virtually packaged file and provide the retrieved file over the network 508 to the requesting client computing device 504 application. In other embodiments, the application server 510 may retrieve a copy of the document file that includes the one or more packaged files from the database 514, extract the requested file, and provided the extracted file to the requesting client computing device 504 application.

In another instance, the application server 510 may receive a request, from a requesting client computing device 506 over the network 508. The request may include a request for a portion of a document, or other electronic file, stored in the database 514. The application server 510 may then retrieve the requested portion of the document from the database 514 and send the retrieved portion of the document to the requesting client computing device 506 over the network 508. The application server 510 is also operable to receive and store documents in the database 514 and receive and store updates to the documents. The updates to the documents may be stored directly in the respective document in the database 514. Alternatively, updates may be stored in the database 514 in an associative manner with a respective document as a markup of the document.

Figure 6:
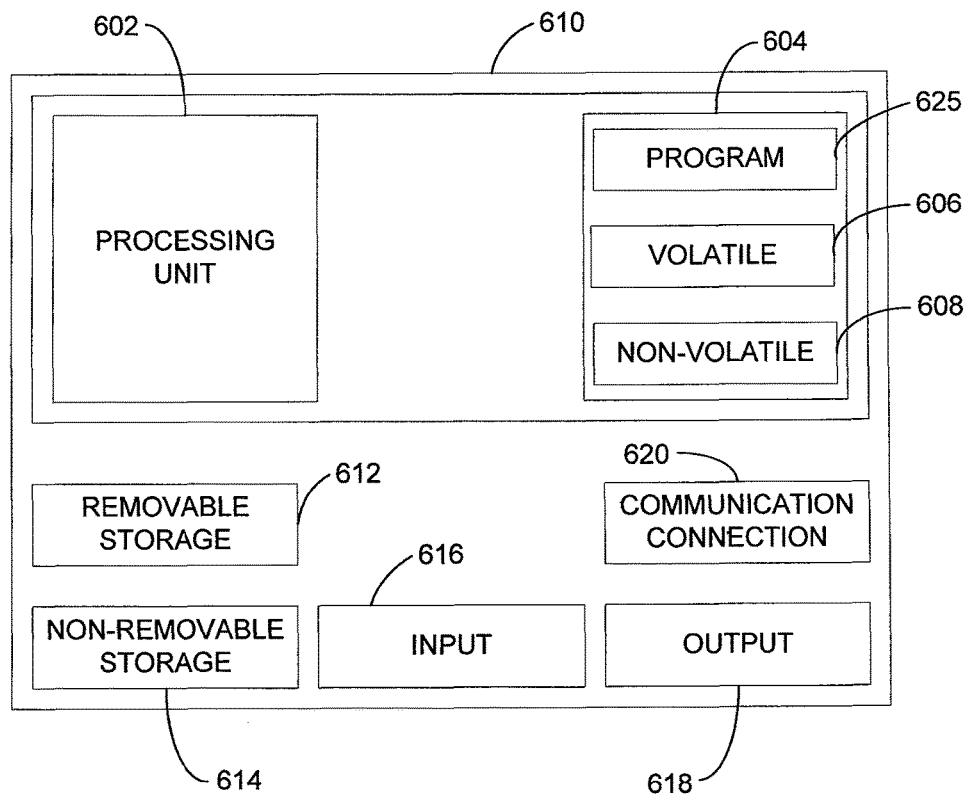
FIG. 6 is a block diagram of a computing device according to an example embodiment.

FIG. 6 is a block diagram of a computing device according to an example embodiment. The computing device is an example of a computing device that may be used as a client computing device 502, 504 and 506 or an application server 510 as illustrated and described with regard to FIG. 5. In one embodiment, multiple such computing devices are utilized in a distributed network to implement multiple components in a transaction-based environment. An object-oriented, service-oriented, or other architecture may be used to implement such functions and communicate between the multiple systems and components.

One example computing device in the form of a computer 610, may include multiple components interconnected via a bus. Such components may include a processing unit 602, memory 604, removable storage 612, and nonremovable storage 614. Memory 604 may include volatile memory 606 and nonvolatile memory 608. Computer 610 may include— or have access to a computing environment that includes—a variety of computer-readable media, such as volatile memory 606 and nonvolatile memory 608, removable storage 612 and nonremovable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 610. A hard drive, CD-ROM, and RAM are some examples of articles including a computer-readable medium. For example, a computer program 625 capable of generating a document with virtually packaged files may be included on a CD-ROM and loaded from the CD-ROM to a hard drive. The computer-readable instructions may be included on the computer-readable medium to perform one or more of the methods and data structures described herein or derived therefrom. An example of such a method is illustrated and described with regard to FIG. 7.

Figure 7:
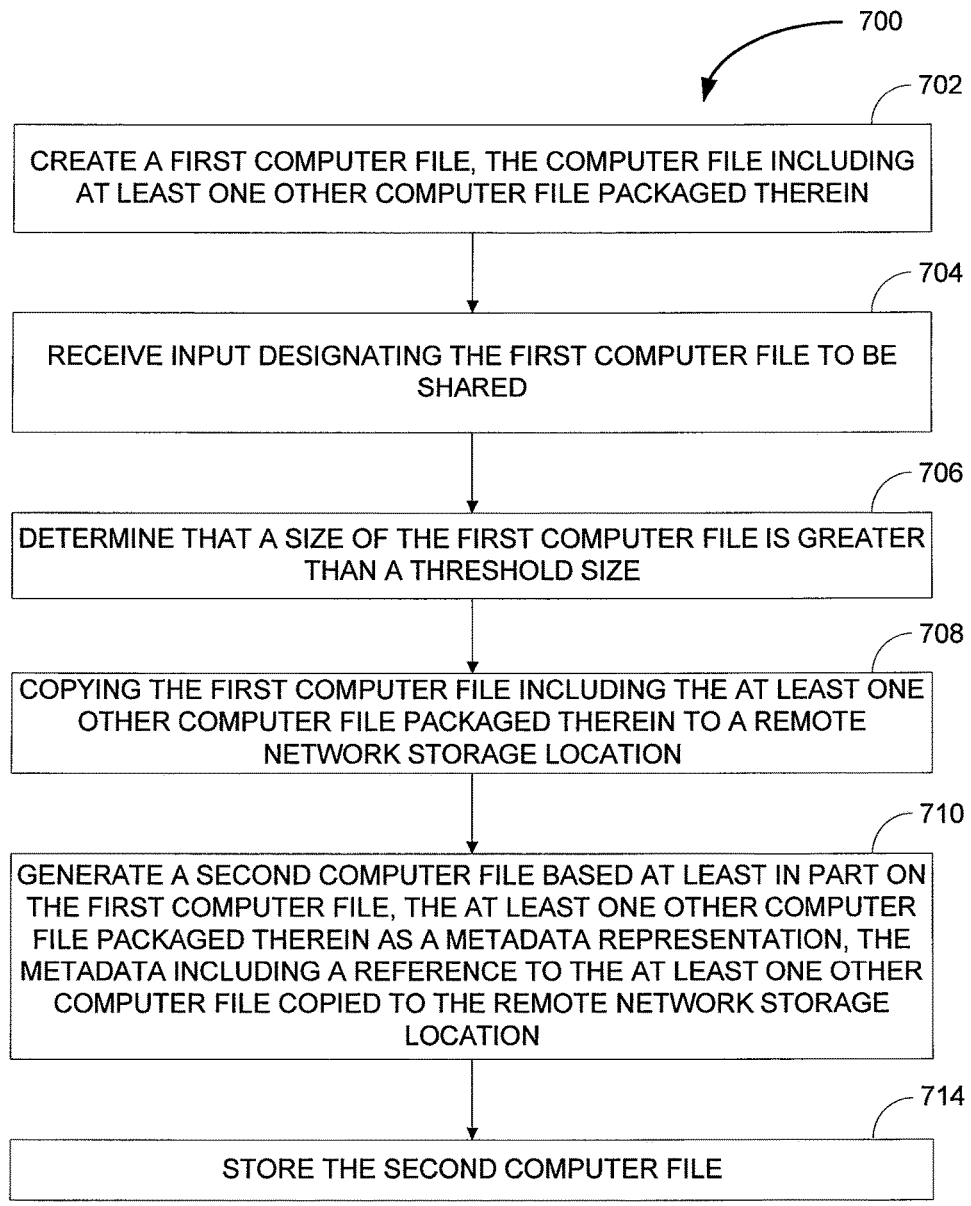
FIG. 7 is a block flow diagram of a method according to an example embodiment.

FIG. 7 is a block flow diagram of a method 700 according to an example embodiment. The method 700 is an example of a method that may be performed to generate a file with at least one other file packaged therein, such as a POLO with a word processing document virtually packaged therein. The method 700 includes creating 702 a first computer file including at least one other computer file packaged therein and receiving 704 input designating the first computer file for sharing, such as over a network, via email, or other distribution mechanisms. Creating 702 the first computer file may include generating or otherwise instantiating a file data structure in a memory or storage device. The received 704 input designating the first computer file for sharing may simply include receiving input to create the file. In further embodiments, input designating the first computer file for sharing may be inherent with regard to all files. In response to receipt 704 input designating the first computer file for sharing, the method 700 evaluates the size of the first computer file to determine if the first computer file can be easily shared in its present form. The concept of "easy sharing" can encompass one or more of any number of factors such as file size, an intended recipient, a number of recipients, security requirements, and other factors depending on the particular embodiment. These factors may be default factors or may be set as configuration settings by a user or administrator.

As illustrated in FIG. 7, the method 700 includes determining 706 that a size of the first computer file is greater than a threshold size and then copying 708 the first computer file including the at least one other computer file packaged therein to a remote network storage location. Following successful copying 708 of the first computer file, a second computer file may then be generated 710 based at least in part first computer file such as generating a copy of the first computer file. Next, in the second computer file, the at least one other computer file packaged therein is represented with metadata including a reference to the at least one other computer file packaged within the first computer file copied 708 to the remote network storage location. In some embodiments, representing the computer file with metadata may include replacing the computer file with the metadata. The second computer file is then stored 714 and may be distributed to other users, human or logical.

The second computer file generated by the method 700, when opened and displayed includes a representation of the at least one other computer file. The representation is generated as a function of the metadata associated with the at least one other computer file. When displayed within an application, the application may be operable to receive a selection of the at least one other computer file for presentation and then download the selected at least one other computer file from the remote network storage location identified in the metadata. The downloaded file may then be presented to a human user, such as through a monitor, or provided to a logical user for further processing. In some embodiments, when the file is downloaded, the second computer file may be updated to include the content of the downloaded file to remove the need to download the file a next time the file is desired.

When presenting the downloaded file to a human user through a monitor, the application may further include receiving input modifying the first computer file or the downloaded file and updating the first computer file copied to the remote network storage location. Updates to the first computer file or downloaded file copied to the remote network storage location may include storing data to the remote network storage location. The stored data typically represents the received input modifying the first computer file and downloaded computer file. In other embodiments, the first computer file or the at least one other file may be replaced with updated files at the remote location. Obtaining the updates may include retrieving data representative of the updates and reproducing those updates locally as a function of that data or retrieving updated files from the remote network storage location.

Figure 8:
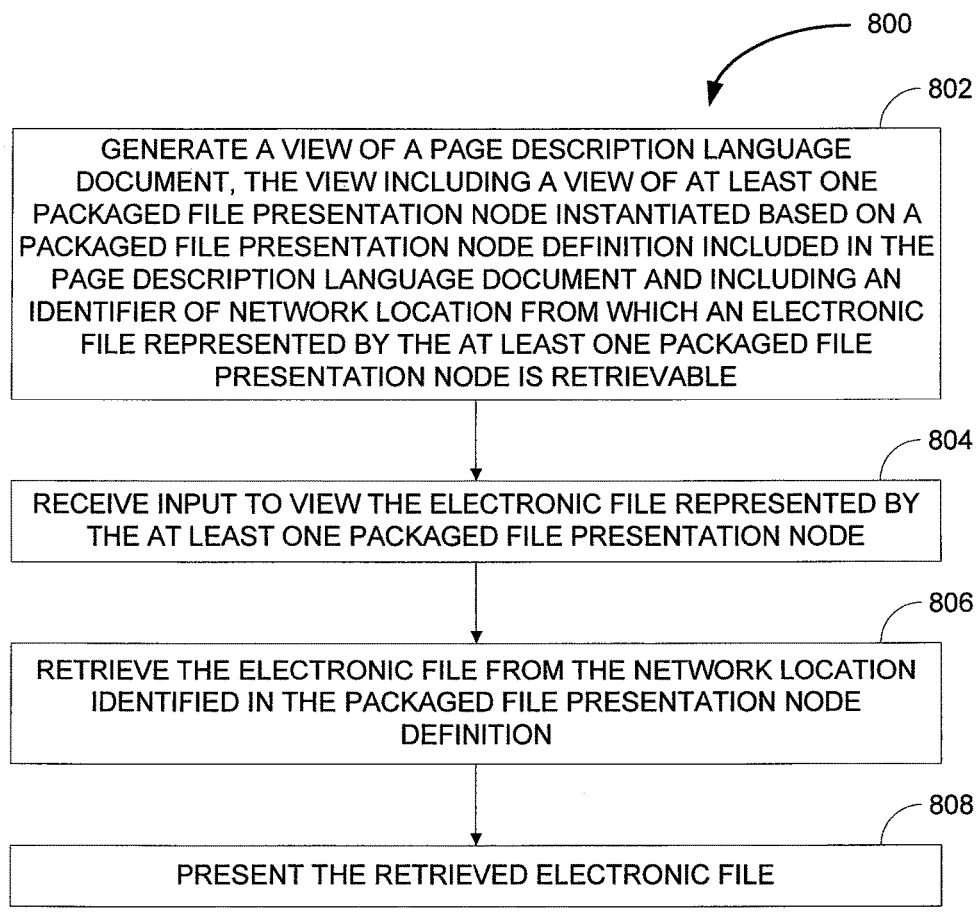
FIG. 8 is a block flow diagram of a method according to an example embodiment.

FIG. 8 is a block flow diagram of a method 800 according to an example embodiment. The method 800 is an example of a method of viewing, in a PFPS, a PDLD including at least one packaged file. The method 800 may be performed by a page description language reader application, such as one of the ADOBE ACROBAT® programs of ADOBE SYSTEMS INCORPORATED.

The method 800 includes generating 802 a view of a page description language document. The generated 802 view may include a view of at least one packaged file presentation node instantiated based on a packaged file presentation node definition included in the page description language document. The packaged file presentation node definition includes an identifier of network location from which an electronic file represented by the at least one packaged file presentation node is retrievable. The method 800 further includes receiving 804 input to view the electronic file represented by the at least one packaged file presentation node and retrieving 806 the electronic file from the network location identified in the packaged file presentation node definition. The retrieved 806 electronic file may then be presented 808.

In some embodiments, the method 800 may further include receiving input modifying the presented electronic file retrieved 806 from the network location and updating the electronic file at the network location. Updating the electronic file may include transmitting data representing the received input modifying the presented electronic file over a network to the network location.

The retrieved 806 electronic file may be packaged within the PDLD in association with the package file presentation node definition and stored. Upon a subsequent receipt 804 of input to view the electronic file, the electronic file may simply be read from the PDLD rather than retrieving 806 the electronic file again. However, an application implementing the method 800 in such embodiments may still retrieve data from the network location when updates to the electronic file or the PDLD are available. In such instances, data representing updates are retrieved and one or both of the electronic file and page description language are updated accordingly. The data representing the updates may include data representative of additions, deletions, and other modifications of electronic files represented as packaged file presentation nodes within the page description language document. The data representing the updates may also include data representative of additions, deletions, and other modifications to the electronic file.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method, stages which have been described and illustrated in order to explain the nature of the inventive subject matter may be made without departing from the principles and scope of the inventive subject matter as expressed in the subjoined claims.

In the foregoing detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining," or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Having thus described the invention, what is claimed is:

1. One or more non-transitory computer storage media storing computer-useable instructions that, when used by one or more computing devices, cause the one or more computing devices to perform operations comprising:
   receiving a request to view an electronic file represented by at least one packaged file presentation node within a page description language document that includes an identifier of a network location from which the electronic file represented by the at least one packaged file presentation node is retrievable;
   responsive to the request, retrieving the electronic file from the network location identified in the page description language document and, when retrieved, the electronic file replaces the at least one packaged file presentation node and is stored as a packaged file within the page description language document; and
   presenting the retrieved electronic file.

2. The media of claim 1, wherein the operations further comprise:
   receiving input modifying the presented electronic file retrieved from the network location; and
   updating the electronic file at the network location.

3. The media of claim 2, wherein updating the electronic file at the network location includes transmitting data over a network to the network location, the transmitted data representing the received input modifying the presented electronic file.

4. The media of claim 1, wherein the operations further comprise:
   packaging the electronic file within the page description language document in association with a package file presentation node definition; and
   storing the page description language document.

5. The media of claim 4, wherein the operations further comprise:
   retrieving data from the network location, the retrieved data representing updates to the electronic file; and updating, within the page description language document, the electronic file as a function of the data retrieved from the network location.

6. The media of claim 5, wherein the updates to the electronic file represented in the retrieved data include additions and deletions of electronic files represented as packaged file presentation nodes within the page description language document.

7. The media of claim 1, wherein the at least one packaged file presentation node is based on a packaged file presentation node definition included in the page description language document.

8. The media of claim 5, wherein the updates to the electronic file represented in the retrieved data include additions and deletions of electronic files represented as packaged file presentation nodes within the page description language document.

9. A system comprising:
a bus;
a network interface coupled to the bus;
a processor coupled to the bus;
a storage device coupled to the bus and storing page description language documents; and
a memory device coupled to the bus and holding an instruction set executable on the processor to cause the system to:
obtain a first page description language document designated for sharing, the first page description language document including a computer file packaged therein;
generate a second page description language document based at least in part of the first page description language document, the second page description language document including a metadata representation of the computer file that indicates a reference to the computer file at a storage location; and
storing the second page description language document, the second page description language document sharable with others, the computer file retrievable by others when in possession of the second page description language document from the storage location as a function of the metadata representation of the computer file included in the second page description language document, and when retrieved, the computer file replaces the metadata representation of the computer file and is included as a packaged file within the second page description language document.

10. The system of claim 9, wherein the storage location is a remote network storage location.

11. The system of claim 9, wherein the instruction set is further executable on the processor to receive at least one update to the first page description language document.

12. The system of claim 11, wherein the instruction set is further executable on the processor to update the first page description language document.

13. The system of claim 9, wherein the instruction set is further executable on the processor to transmit the second page description language document upon a request to view the second page description language document.

14. The system of claim 9, wherein the instruction set is further executable on the processor to create the first page description language document.

15. The system of claim 14, wherein the instruction set is further executable on the processor to copy the first page description language document to the storage location.

16. A method comprising:
receiving a request to view an electronic file represented by at least one packaged file presentation node within a page description language document that includes an identifier of a network location from which the electronic file represented by the at least one packaged file presentation node is retrievable;
responsive to the request, retrieving the electronic file from the network location identified in the page description language document and, when retrieved, the electronic file replaces the at least one packaged file presentation node and is stored as a packaged file within the page description language document; and
presenting the retrieved electronic file.

17. The method of claim 16, further comprising:
receiving input modifying the presented electronic file retrieved from the network location; and
updating the electronic file at the network location.

18. The method of claim 17, wherein updating the electronic file at the network location includes transmitting data over a network to the network location, the transmitted data representing the received input modifying the presented electronic file.

19. The method of claim 16, further comprising:
packaging the electronic file within the page description language document in association with a package file presentation node definition; and
storing the page description language document.

20. The method of claim 19, further comprising:
retrieving data from the network location, the retrieved data representing updates to the electronic file; and
updating, within the page description language document, the electronic file as a function of the data retrieved from the network location.

* * * * *